Patented June 13, 1944

2,351,562

UNITED STATES PATENT OFFICE 2,351,562

CATALYSIS

Preston L. Veltman, Fishkill, N. Y., assignor, by mesne assignments, to The Texas Company, New York, N. Y., a corporation of Delaware No Drawing. Application May 2, 1941,
Serial No. 391,482

9 Claims. (Cl. 260—683.5)

This invention relates to a catalyst for the conversion of hydrocarbons and particularly for effecting molecular transformation of petroleum hydrocarbons.

Broadly, the invention contemplates a catalyst comprising a metallic halide containing two or more different halogen atoms, namely, fluorine, chlorine, bromine or iodine, combined with one metal in the same molecule, and which will be defined herein as a mixed metallic halide. Examples of such catalysts comprise aluminum dichloro fluoride, aluminum chloro difluoride, aluminum chloro pentafluoride ($Al_2ClF_5$) and mixtures of molecules of this nature. Hydrogen halide, boron halide or alkyl halides may be used as a promoter for the mixed metallic halide catalyst.

The invention contemplates the employment of a catalyst comprising a mixed metallic halide of the foregoing type or a mixture of two or more of these mixed metallic halides for effecting conversion and/or molecular transformation of hydrocarbons, and particularly petroleum hydrocarbons.

The present application is a continuation-in-part of pending application Serial No. 350,097, filed August 2, 1940, for Catalysis, and the present application is particularly concerned with the employment of the foregoing type of catalyst for effecting isomerization of straight chain hydrocarbons to produce branched chain hydrocarbons.

The mixed halides of this invention, including hydrated forms thereof, may be employed alone or in combination with other catalytic agents or with suitable carrier or supporting materials, or may be dissolved or dispersed in suitable liquid media. Thus, these mixed metallic halides may be employed in conjunction with simple metallic halides of the type $AlCl_3$, $SbCl_3$, etc. Examples of suitable carriers comprise natural or artificial clays, such as aluminum silicates and fuller's earth. Other materials include silica, alumina, diatomaceous earth, bauxites, aluminum phosphate and the like, including mixtures thereof. Suitable liquid media would include inorganic salts of relatively low melting point, such as $SbCl_3$ and $SbF_5$, metallic organic compounds, and organic compounds capable of carrying the catalyst in suspension or in solution. Certain metallic halide-hydrocarbon complexes may also serve as carriers for the catalysts described herein such as the complex often formed during the isomerization of hydrocarbons with metallic halides.

Also it is contemplated that the catalyst may be used in a finely powdered form suspended in a stream of hydrocarbon vapor or gas undergoing treatment by contact with the suspended catalyst.

It is already known to employ a metallic halide, such as aluminum chloride, as a catalyst for effecting cracking, isomerization, polymerization and alkylation of hydrocarbons. Aluminum chloride, promoted with hydrogen chloride, is an effective catalyst in such reactions, but its employment may be attended with certain difficulties, such as a tendency toward formation of sludge by-products. Moreover, aluminum chloride has appreciable solubility in liquid hydrocarbons so that in liquid phase operations considerable migration of the catalyst occurs. Also, it has a tendency to sublime in a reaction system where vaporized hydrocarbons are being treated with the catalyst in solid form.

A complex metallic halide, such as fluorinated aluminum chloride, as contemplated by the present invention, provides a catalyst which is superior to ordinary aluminum chloride with respect to resistance to sludging and subliming tendencies. It is less soluble in mineral oil and also requires a higher temperature for sublimation.

A quantity of aluminum chloro-fluoride catalyst was prepared by subjecting anhydrous aluminum chloride vapors at the sublimation temperature at atmospheric pressure to intimate contact with boron trifluoride in a glass tube so as to form a mixed aluminum chloro-fluoride salt and boron trichloride. The aluminum chloride and boron trifluoride were charged to the reaction in the proportion of 261.5 parts by weight of anhydrous aluminum chloride to 55 parts of boron trifluoride, the resulting solid product amounting to 228.5 parts by weight. These proportions can be changed so as to vary the amount of fluorine substituted for chlorine in the original aluminum chloride. The amount of boron trifluoride added was somewhat in excess of that theoretically required to form a compound having the formula $AlCl_2F$.

A bright yellow crystalline material was formed as an intermediate product which melted and decomposed during continued heating to give the mixed halides and $BCl_3$. The boron trichloride was condensed and recovered quantitatively in a trap cooled in a bath comprising a mixture of dry ice and kerosene.

The solid product finally obtained had a grey-white appearance, sublimed at a much higher temperature than aluminum chloride, dissolved slowly in water, and apparently is substantially insoluble in paraffinic hydrocarbons and alkyl halides. Its chemical analysis corresponds approximately to a mixed halide having a stoichiometric formula of $AlCl_2F$, and is substantially free from boron and boron halides. The chemical reaction forming this catalyst apparently involves a process of double decomposition as indicated by the following equations:

$$3AlCl_3 + BF_3 \rightarrow 3AlCl_2F + BCl_3$$

$$3AlCl_2F + BF_3 \rightarrow 3AlClF_2 + BCl_3 \uparrow \text{ etc.}$$

Mixed metallic halides can be prepared by simple partial replacement reactions using elemental halogens. The ability to displace one another from salts decreases in the order of fluorine, chlorine, bromine and iodine. That is fluorine can displace chlorine, bromine and iodine, while chlorine can displace only bromine and iodine. Bromine can displace iodine only. By suitable selection of salts and control of the conditions under which the reaction is effected substantially any halogen ratio can be obtained in a single salt.

It is contemplated that many non-metallic fluorine compounds can be used as a source of fluorine. Hydrogen fluoride, silicon tetrafluoride and organic fluorides react, at moderate temperatures, with metal salts, such as aluminum chloride, to give aluminum chloro fluoride which comprises one of the types of catalysts contemplated herein.

A sample of this catalyst was employed as an isomerization and cracking catalyst in which normal pentane was subjected to conversion by contact with the catalyst at a relatively low temperature. In this experiment 1224 parts of normal pentane, 135.1 parts of catalyst and 5.9 parts of water by weight, were charged to a reaction vessel. The mixture was maintained in the vessel at a temperature of about 160° F. for a period of about four hours, the pressure ranging from about 40 to 117 pounds per square inch gauge.

As a result of this treatment the hydrocarbon product comprises 96.7% by weight of the normal pentane charge. The remaining 3.3% of the charge was in the form of a metallic halide-hydrocarbon-water mixture.

The hydrocarbon product was subjected to a low temperature fractional distillation, obtaining the following fractions and yields thereof, expresser as mol per cent:

| | Mol per cent |
|---|---|
| Hydrocarbons boiling below isobutane | 0.1 |
| Isobutane | 53.0 |
| n-Butane | 4.7 |
| Isopentane | 20.5 |
| n-Pentane | 5.4 |
| Hydrocarbons boiling above n-pentane | 16.3 |

The foregoing analysis demonstrates that the catalyst is highly active for catalyzing either isomerization or cracking reactions.

In another example a mixed halide catalyst was prepared by reacting aluminum chloride and boron trifluoride at a temperature of 230 to 235° F. The reaction was effected in a heated cylindrical reaction tower through which powdered aluminum chloride of about 100 mesh was forced by means of a conveyer screw. Boron trifluoride was passed through the tower concurrently with the aluminum chloride in the proportion of approximately 136 parts by weight of boron trifluoride to 450 parts by weight of aluminum chloride over a period of about 100 minutes.

The resulting catalyst contained 47.9% chlorine and 33.2% fluorine and was substantially free from boron, containing not more than about 0.06% boron by weight. It was in the form of a finely divided grey powder.

A quantity of this catalyst was used to isomerize normal pentane at a temperature of 130° F. in a batch liquid phase operation, the time of reaction being four hours. The quantity of catalyst charged to the reactor amounted to 10% by weight of the normal pentane. The reaction was carried out without the addition of any promoter. The hydrocarbon reaction product obtained had the following composition:

| | Per cent |
|---|---|
| Isobutane | 4.6 |
| n-Butane | 1.9 |
| Isopentane | 62.4 |
| n-Pentane | 26.8 |
| Residue | 4.3 |

Thus, the reaction product contained 62.4% isopentane and in addition examination of the catalyst indicated the absence of any complex formation, the catalyst being relatively unchanged in physical appearance.

Another sample of aluminum chlorofluoride catalyst (containing 58% fluorine) was used to isomerize n-butane in batch liquid phase at 250° F. Ten per cent of catalyst and 2% HCl, by weight, based on total charge to the reactor, were charged to the system. A four hour reaction period was used and the hydrocarbon reaction product obtained had the following composition:

| | Per cent |
|---|---|
| Hydrocarbons below $C_4$ | 1.5 |
| Isobutane | 60.8 |
| n-Butane | 34.1 |
| Hydrocarbons heavier than $C_4$ | 3.6 |

The catalyst was recovered as a light dry powder apparently unchanged. There was no evidence of "complex" formation.

While a mixed halide of aluminum has been described above, it is nevertheless contemplated that mixed halides of other metals capable of combining with two or more halogen atoms may be used. Polyvalent metals in groups 2, 3, 4, 5 and 6 of the periodic table including iron, cobalt, nickel and the noble metals are capable of being prepared in the metal-mixed halide form. It is contemplated that the mixed halide compound may be a metallic halide which is either lightly or heavily fluorinated. It may have an empirical formula such as $MeH^1_xH^2_y$ where $x$ and $y$ have values sufficient to satisfy the valency of the particular metal in question, and $H^1$ and $H^2$ are different halogen atoms connected to the same metal atom as for example $SbCl_2F$, $SbCl_2Br$, $SbClF_2$, etc. and mixtures thereof.

Also it is contemplated that the catalyst of this invention may comprise a mixture of mixed halide compounds of two or more different metals.

Although batch liquid phase experiments have been described above it is contemplated employing the catalyst in continuous flow operations and in either liquid or vapor phase treatment.

Different temperature conditions may be employed in using the catalyst for carrying out the isomerization reaction depending upon the nature of the hydrocarbon feed to be treated. For example, in isomerizing a feed hydrocarbon consisting essentially of normal butane a temperature in the range 180 to 300° F. may be employed, but preferably a temperature of about 210 to 250° F. If the feed consists essentially of normal pentane the temperature employed may be in the range 100 to 250° F. and preferably about 130° F. The optimum temperature, of course, would depend upon the contact time used for any particular hydrocarbon or mixture of hydrocarbons charged to the isomerizing unit.

Also while specific procedures for preparing the catalyst have been described, it is contemplated that these procedures may be varied and that other methods may be employed.

Obviously many modifications and variations of the invention, as hereinbefore set forth, may be made without departing from the spirit and scope thereof, and therefore only such limitations should be imposed as are indicated in the appended claims.

I claim:

1. A method of isomerizing straight chain paraffin hydrocarbons which comprises subjecting said hydrocarbons to contact with an active catalyst comprising a metallic mixed halide containing at least two different halogen atoms in the same molecule, said halide being substantially free from boron and boron halides, and effecting said contact under isomerizing conditions in the presence of hydrogen halide such that substantial conversion to branched chain hydrocarbons is secured.

2. A method of isomerizing straight chain paraffin hydrocarbons which comprises subjecting said hydrocarbons to contact with an active catalyst comprising as the sole active isomerizing agent a metallic mixed halide containing at least two different halogen atoms in the same molecule, having the approximate empirical formula $MeH^1_xH^2_y$, where Me signifies a metal, $H^1$ and $H^2$ signify different halogen atoms and $x$ and $y$ have values sufficient to satisfy the valency of the metal, and effecting said contact under isomerizing conditions in the presence of hydrogen halide such that substantial conversion to branched chain hydrocarbons is secured.

3. A method of isomerizing straight chain paraffin hydrocarbons which comprises subjecting said hydrocarbons to contact with an active catalyst comprising as the sole active isomerizing agent a metallic mixed halide containing at least two different halogen atoms in the same molecule, and connected to the same metal atom, and effecting said contact under isomerizing conditions in the presence of hydrogen halide such that substantial conversion to branched chain hydrocarbons is secured.

4. A method of isomerizing a hydrocarbon feed consisting mainly of normal pentane which comprises subjecting the feed hydrocarbon to contact with an active catalyst comprising as the sole active isomerizing agents aluminum mixed halide containing chlorine and fluorine atoms in the same molecule, and effecting the contact under isomerizing conditions in the presence of hydrogen halide at a temperature in the range of about 100 to 250° F. such that substantial conversion to isopentane is secured.

5. A method of isomerizing a hydrocarbon feed consisting essentially of normal butane which comprises subjecting the feed hydrocarbon to contact with an active catalyst comprising as the sole active isomerizing agent aluminum mixed halide containing chlorine and fluorine atoms in the same molecule, and effecting the contact under isomerizing conditions in the presence of hydrogen halide and at a temperature in the range 180 to 300° F. such that substantial conversion to isobutane is secured.

6. A method of converting straight-chain paraffin saturated hydrocarbons which comprises subjecting the feed hydrocarbon to the action of a catalyst comprising a metallic mixed halide containing at least two different halogen atoms in the same molecule, having the approximate empirical formula $MeH^1_xH^2_y$, where Me signifies a metal, $H^1$ and $H^2$ signify different halogen atoms and $x$ and $y$ have values sufficient to satisfy the valency of the metal, said catalyst being substantially free from boron and boron halides, and effecting contact between the feed hydrocarbon and said catalyst under isomerizing conditions such that conversion of feed hydrocarbons into isomers having the same number of carbon atoms per molecule constitutes the principal reaction.

7. The method according to claim 6 in which the catalyst comprises a mixed halide of aluminum.

8. A method of isomerizing saturated hydrocarbons which comprises subjecting said hydrocarbons to contact with a catalyst in which the sole active isomerizing agent is a metallic mixed halide containing at least two different halogen atoms in the same molecule, and connected to the same metal atom, and effecting said contact at a temperature in the range 180 to 300° F. in the presence of hydrogen halide such that substantial conversion to isomers is secured.

9. A method of isomerizing saturated hydrocarbons which comprises subjecting the saturated hydrocarbons to contact with a solid catalyst formed by reacting aluminum chloride with boron trifluoride at the sublimation temperature for aluminum chloride under conditions of reaction so as to form a yellow crystalline intermediate reaction product, and subjecting said intermediate product to continued heating to convert it into a relatively stable solid of greyish appearance and consisting essentially of aluminum chlorfluoride having the approximate empirical formula $AlCl_xF_y$, where $x$ and $y$ have values sufficient to satisfy the valency of the aluminum, and effecting said contact under isomerizing conditions in the presence of hydrogen halide such that substantial conversion to isomers is secured.

PRESTON L. VELTMAN.